(12) United States Patent
Segler et al.

(10) Patent No.: US 8,478,784 B2
(45) Date of Patent: Jul. 2, 2013

(54) BUILDING A GEOGRAPHIC DATABASE

(75) Inventors: Michael Segler, Wiesloch (DE); Philipp Hassler, Nussloch (DE); Thorsten Bender, Ludwigshafen (DE)

(73) Assignee: SAP Aktiengesellschaft, Walldorf (DE)

( * ) Notice: Subject to any disclaimer, the term of this patent is extended or adjusted under 35 U.S.C. 154(b) by 1791 days.

(21) Appl. No.: 10/306,808

(22) Filed: Nov. 27, 2002

(65) Prior Publication Data

US 2004/0103117 A1  May 27, 2004

(51) Int. Cl.
*G06F 17/00* (2006.01)
(52) U.S. Cl.
USPC ........... 707/790; 707/608; 707/705; 707/813; 707/899; 707/821
(58) Field of Classification Search
USPC .............. 707/101, 104.1, 100, 608, 705, 790, 707/813, 821, 899; 701/201, 208, 211
See application file for complete search history.

(56) References Cited

U.S. PATENT DOCUMENTS

| | | | | |
|---|---|---|---|---|
| 5,559,707 A | * | 9/1996 | DeLorme et al. | 701/200 |
| 5,797,112 A | * | 8/1998 | Komatsu et al. | 701/201 |
| 5,948,040 A | * | 9/1999 | DeLorme et al. | 701/201 |
| 6,208,934 B1 | * | 3/2001 | Bechtolsheim et al. | 701/428 |
| 6,321,158 B1 | * | 11/2001 | DeLorme et al. | 701/201 |
| 2001/0025222 A1 | * | 9/2001 | Bechtolsheim et al. | 701/209 |

OTHER PUBLICATIONS

Oracle: "Oracle interMedia Locator" On-Line Documentation, [Online] Jun 22, 2000 Retrieved from the Internet: URL:http://download-west.oracle.com/otn_hosted_doc/intermedia/inter.816/intermedia_locator.pdf> [retrieved on Feb. 10, 2005].
Flammia G: "The invisible Internet meets desktop applications" IEEE Intelligent Systems, [Online] vol. 13, No. 6. Nov. 1998, pp. 74-75, XP002317312 ISSN: 1094-7167 Retrieved from the Internet: URL:http://www.mikemccandless.com/ieee/nov98.
Biswas P. et al., "Leveraging Location-Based Services for Mobile Applications" Oracle Technical White Paper, XX, XX, Jun. 2001, pp. 1-17.
Mapinfo: "Enterprise Mapping Deployments" Internet Publication,[Online] 2001, Retrieved from the Internet: URL:http://extranet.mapinfo.com/common/library/enterprise_whitepaper.pdf> [retrieved on May 24, 2007].

* cited by examiner

*Primary Examiner* — Sana Al Hashemi
(74) *Attorney, Agent, or Firm* — Blakely Sokoloff Taylor & Zafman, LLP

(57) ABSTRACT

A system receives output geographic information en masse from a server. The output geographic information corresponds to input geographic information provided to the server en masse. The system builds a database that indexes at least some of the output geographic information to at least some of the input geographic information, attempts to locate specific output geographic information in the database, and determines the specific output geographic information by calculation if the specific output geographic information cannot be located in the database.

10 Claims, 6 Drawing Sheets

BUILDING A GEOGRAPHIC DATABASE

TECHNICAL FIELD

This application relates generally to building a geographic database and to using the geographic database as a resource for obtaining geographic information.

BACKGROUND

In operation, a geographic server (hereinafter "geo-server") receives input geographic information and provides output geographic information in response to the input geographic information. For example, a geo-server may receive addresses from an external computer system. The geo-server may translate those addresses to geographic coordinates, such as longitudes and latitudes, and output the geographic coordinates. This translation process is known as "geocoding". Other information that may be provided by a geo-server may include travel distance, routes, and/or travel times between two locations.

Geo-servers often have slow response times. Network delays can compound these slow response times.

SUMMARY

In general, in one aspect, the invention is directed to a system that receives output geographic information en masse from a server. The output geographic information corresponds to input geographic information provided to the server en masse. The system builds a database that indexes at least some of the output geographic information to at least some of the input geographic information, attempts to locate specific output geographic information in the database, and determines the specific output geographic information by calculation if the specific output geographic information cannot be located in the database. This aspect may include one or more of the following features.

The system may attempt to locate specific output geographic information that corresponds to specific input geographic information. The system may calculate a straight-line distance using the specific input geographic information if the specific output geographic information cannot be located in the database. The system may calculate the straight-line distance using geographic coordinates as the specific input geographic information.

The receiving and building performed by the system may be performed by maintenance software and the attempting and determining performed by the system may be performed by separate, or the same, application software.

When building the database, the system may index the output geographic information in the database based on the geographic server that provided the output geographic information and/or by geographic region. The geographic region may be at least one of an area of a country, a country, and a continent. The input geographic information may include sets of locations and the output geographic information may include routes between the sets of locations and travel durations between the sets of locations. The sets of locations may be defined in terms of geographic coordinates, addresses, or other location-defining indicia.

Other features and advantages of the invention will become apparent from the following description, including the claims and drawings.

DESCRIPTION

Figure 1:
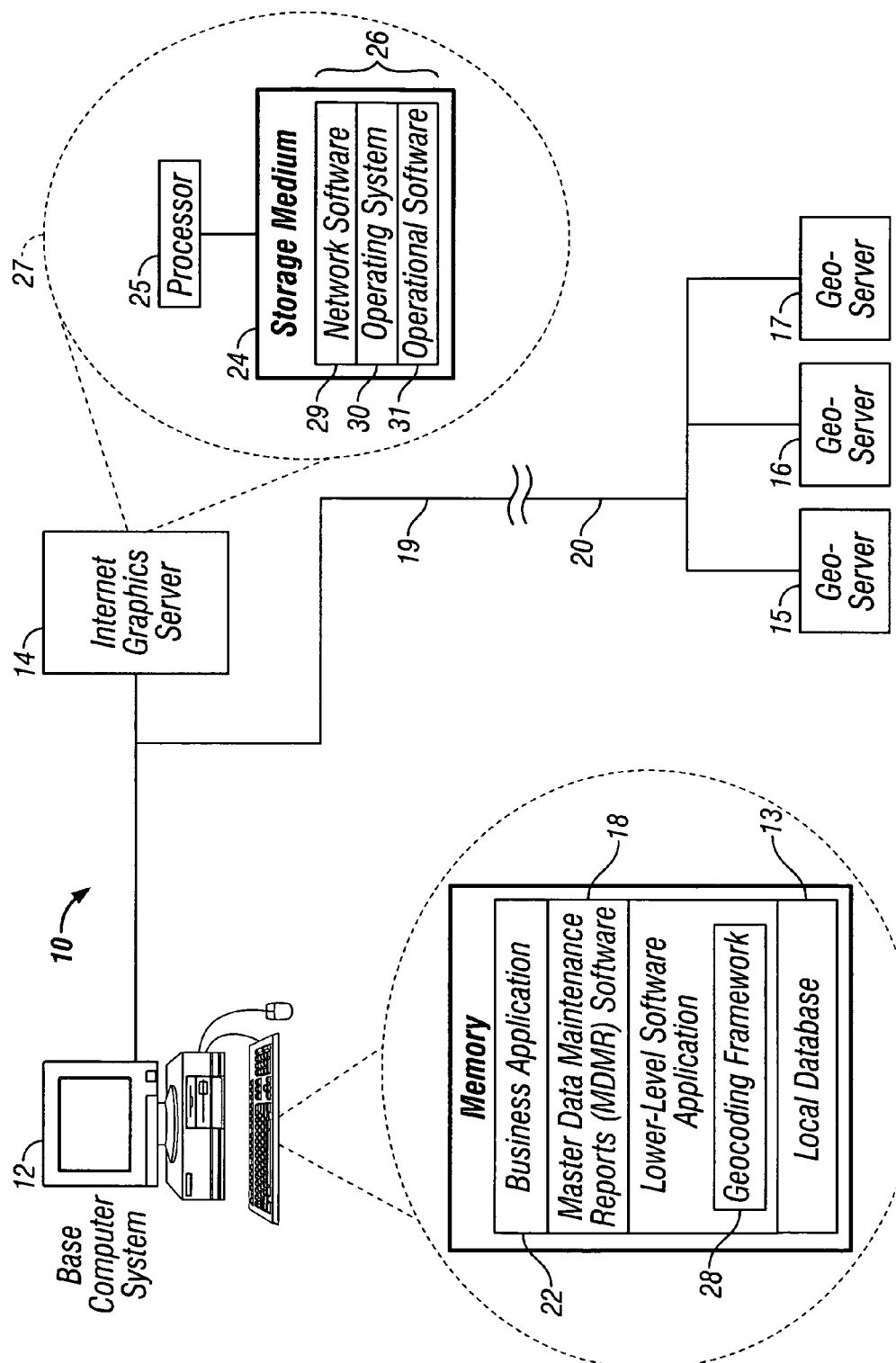
FIG. 1 is a block diagram of a network containing an Internet Graphics Server.

Referring to FIG. 1, a network 10 includes a base computer system 12, an Internet Graphics Server (IGS) 14, and multiple geo-servers 15, 16, 17. Connections between these and other devices on network 10 may be via Ethernet, phone line, and/or wireless link, for example. Network 10 may include a local portion 19 comprised of base computer system 12 and IGS 14 and an external portion 20 comprised of geo-servers 15, 16, 17. The local portion may be a local area network (LAN) running a protocol such as RFC, and the external portion may be a wide area network (WAN) and/or the Internet running a protocol such as HTTP (HyperText Transfer Protocol). It is noted that devices depicted on the local portion may be on the external portion and vice versa.

Geo-servers 15, 16, 17 are used by various geocoding services, such as the ESRI ArcIMS and PTV eMapServer, to provide output geographic information to IGS 14 in response to input geographic information received from IGS 14. Generally speaking, the term "geocoding" refers to converting input geographic information, such as addresses, into output geographic coordinates. Geo-servers also provide other features, such as route planning and distance calculation. These features enable users to plan routes and determine distances between specified locations.

Thus, the input or output geographic information referred to above may include geographic coordinates (e.g., a longitude and latitude) of an address. The input or output geographic information may include a street address, a city, a country, and the like. The output geographic information may also include, e.g., routes, such as streets, between two locations, travel time between those locations, and map(s) showing the locations, and the like. Geographic information other than that described here may also be used for input or output.

IGS 14 has a server architecture in which data from base computer system 12 and/or other source(s) can be used to generate graphical or non-graphical output. IGS 14 can be used to encapsulate geo-servers' functionality. To this end, IGS 14 provides, to the base computer system or other source(s), geographic services including, but not limited to, sending and receiving requests for displaying maps, routes, planning, coordinates, travel durations, and addresses.

Base computer system 12 runs one or more software applications (i.e., computer programs), which may provide inputs to IGS 14. Among these applications is business application 22. One example of business application 22 is a transportation planning application, although business application may be any type of computer program that may be used in connection with operating a business.

In this embodiment, business application 22 contains various features relating to supply chain management. Supply chain management refers, generally, to managing commerce (e.g., product shipments) between a manufacturer, various intermediaries, such as distribution centers, wholesalers and the like, and customers. Business application 22 may be used in determining routes for transporting goods along the supply chain, among other things. Business application 22 may also be used to generate one or more graphical user interfaces (not shown) that include one or more fields for entering geographic information that can be provided to IGS 14.

Master Data Maintenance Reports (MDMR) software 18 communicates with IGS 14 to build a local database (described below) containing geographic information. MDMR software 18 also communicates with IGS 14 to update the local database.

In this embodiment, IGS 14 is a dedicated computer or other processing device that contains storage medium 24 and one or more processors 25 that run software (executable instructions) 26 stored in storage medium 24 to provide the functionality described herein (see view 27, which depicts the architecture of IGS 14). It should be noted, however, that IGS 14 is not limited to this architecture and can include any combination of hardware and/or software, as noted below.

Software 26 may include, but is not limited to, network software 29 for communicating over network 10, operating system software 30, and operational software 31 for transmitting information between geo-servers 15, 16, 17 and base computer system 12. Operational software 31 may include various modules that convert data between formats for transmission to applications running on base computer system 12 and from such applications to a geo-server.

Figure 2:
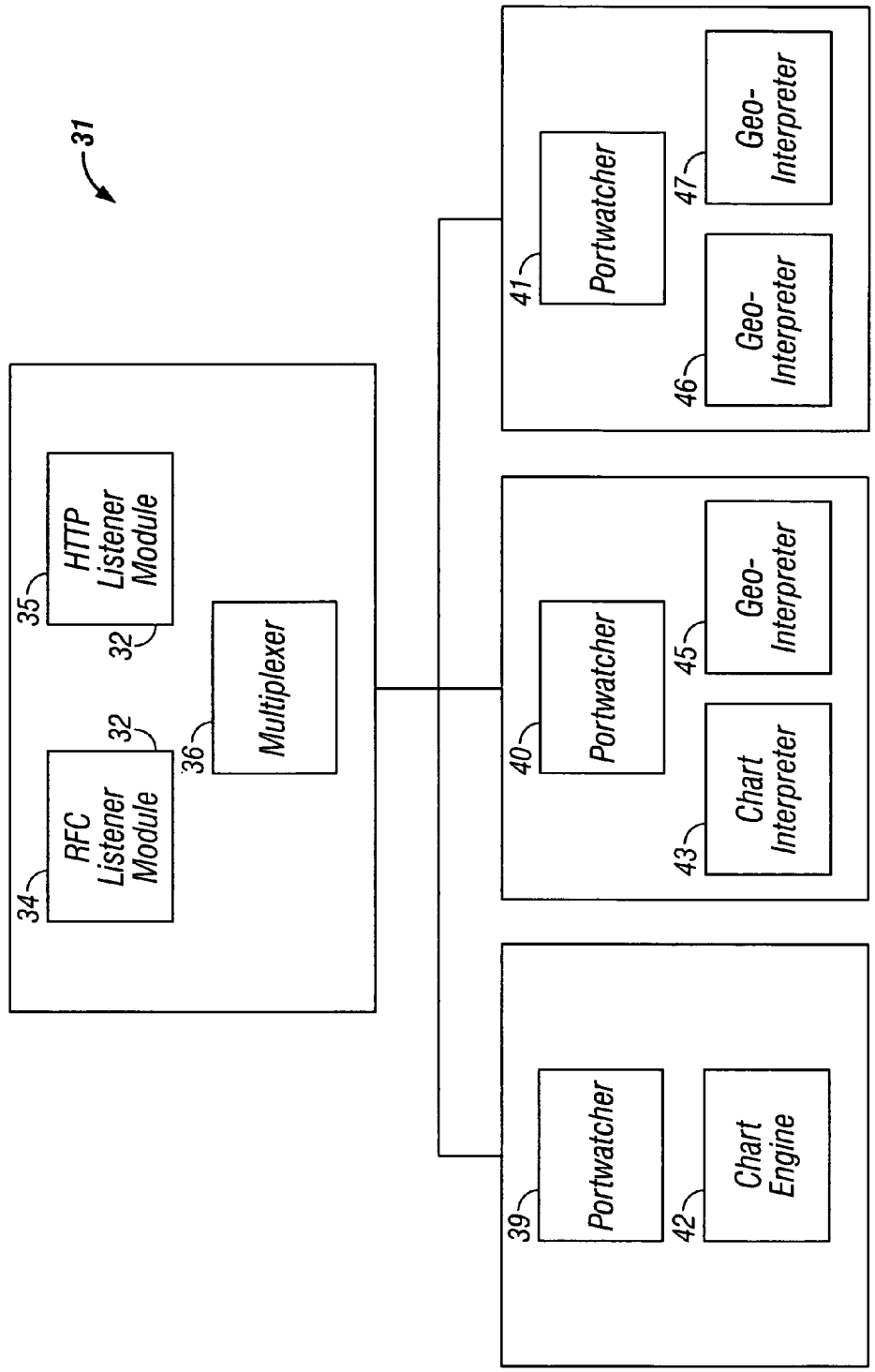
FIG. 2 is a block diagram of the software architecture of the Internet Graphics Server.

FIG. 2 shows the architecture of operational software 31 in one embodiment of IGS 14. Operational software 31 includes communication modules 32. Communication modules 32 include RFC listener module 34 and HTTP listener module 35. RFC listener module 34 and HTTP listener module 35 "listen" for communications from network 10, e.g., to pick-up communications from base computer system 12.

More specifically, communication modules 32 receive data from network 10, filter the data to detect IGS-destined communications, convert the data from the RFC or HTTP format to an IGS-internal data format, and provide the resulting converted data to multiplexer 36. Communication modules 32 also output data from IGS 14 (to, e.g., base computer system 12) onto network 10, in the process performing any necessary conversions to RFC or HTTP format.

Multiplexer 36 is the central instance for data communications between communication modules 32 and portwatchers 39, 40, 41 (described below). Multiplexer 36 sends data packets from a communication module, via a portwatcher, to an interpreter (described below). Multiplexer 36 "knows" which interpreters are available and therefore can assign the data packets based on the number of available interpreters in order to balance the load of each interpreter.

Multiplexer 36 can also turn interpreters on and off via a portwatcher. As a result, multiplexer 36 can perform active load balancing. That is, if the number of data packets exceeds a predetermined limit, then multiplexer 36 can turn on an interpreter and thereby lessen the number of data packets that each of the other interpreters must process. In this embodiment, there is one multiplexer for IGS 14; however, any number of multiplexers can be used.

A portwatcher is a software module that instantiates the components (e.g., the interpreters) configured for the portwatcher, registers with multiplexer 36, and informs multiplexer 36 of the interpreters that are available.

Each portwatcher communicates with multiplexer 36 using a socket interface or a shared memory if the multiplexer and portwatchers use the same hardware. A portwatcher receives its "requests" (e.g., to generate an image or to obtain "geocoordinates") from multiplexer 36 and can return its status if requested by multiplexer 36. Requests that portwatchers receive from multiplexer 36 are sent by the portwatchers to the appropriate interpreters. A portwatcher may service one or more software modules (e.g., interpreters, engines, etc.). These software modules carry-out the requests and send results back to multiplexer 36 via the portwatchers.

Software modules 42, 43, 45, 46, 47, which are C++ "plug-ins" in this embodiment, are installed on IGS 14.

IGS Geo-Services

Referring to FIGS. 1 and 2, geo-interpreters 45, 46, 47 correspond to respective geo-servers 15, 16, 17. Each geo-interpreter is designed to communicate with its corresponding geo-server. A single geo-interpreter may communicate with multiple geo-servers and multiple geo-interpreters may communicate with a single geo-server.

Each geo-server 15, 16, 17 is capable of recognizing data having a specific format. Data that is not formatted properly, in general, cannot be processed by the geo-server and/or may not be processed properly. Geo-interpreters 45, 46, 47 perform data formatting for their respective geo-servers 15, 16, 17. For example, in a case that geo-interpreter 45 is written for geo-server 15, geo-interpreter 45 generates data that is in a communication format that geo-server 15 understands. In a case that geo-interpreter 46 is written for geo-server 16, geo-interpreter 46 generates data that is in a format that geo-server 16 understands, and so on.

Each geo-server also has a specific access protocol. The geo-interpreters are therefore also configured to provide the correct access protocol for their corresponding geo-servers.

Any number of geo-interpreters may be installed per IGS, thereby permitting connection to any number of different geo-servers. Interpreters may also be included in IGS 14 to connect to other geographic and/or non-geographic information systems, such as map databases and the like.

Figure 3:
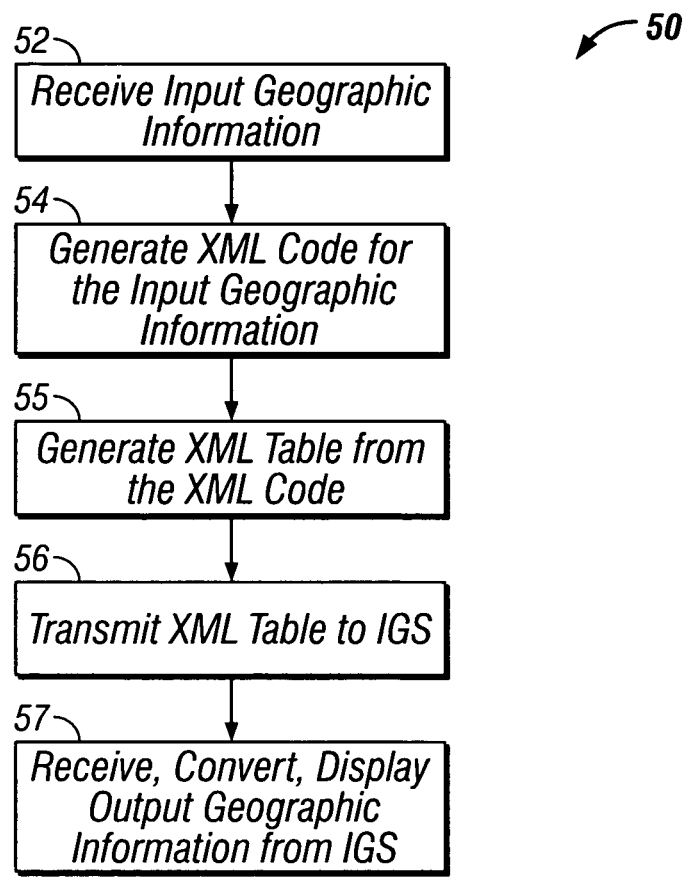
FIG. 3 is a flowchart showing a process for providing data to the Internet Graphics Server.

FIG. 3 shows a process 50 to provide geographic services from IGS 14 to base computer system 12 (or, more particularly, to software running on base computer system 12). Base computer system 12 receives (52) input geographic information from e.g., a database or GUIs (not shown). Base computer system 12 passes the input geographic information to a lower-level software application 23 on base computer system 12. Lower-level software application 23 generates (54) standard extensible Markup Language (XML) code that defines the address information and passes that XML code to a geocoding framework application 28 within lower-level application 23.

Geocoding framework application 28 generates (55) a table from the XML code and passes that table back to business application 22. Geocoding framework application 28 generates the table by extracting XML fields from the XML code and inserting the former XML fields into the table. In this embodiment, the table is a look-up table (LUT) containing rows that include the XML code; however, other types of tabular and non-tabular formats may be used. Base computer system 12 transmits (56) the table containing the XML code to IGS 14 via network 10 using a protocol such as HTTP or RFC.

Figure 4:
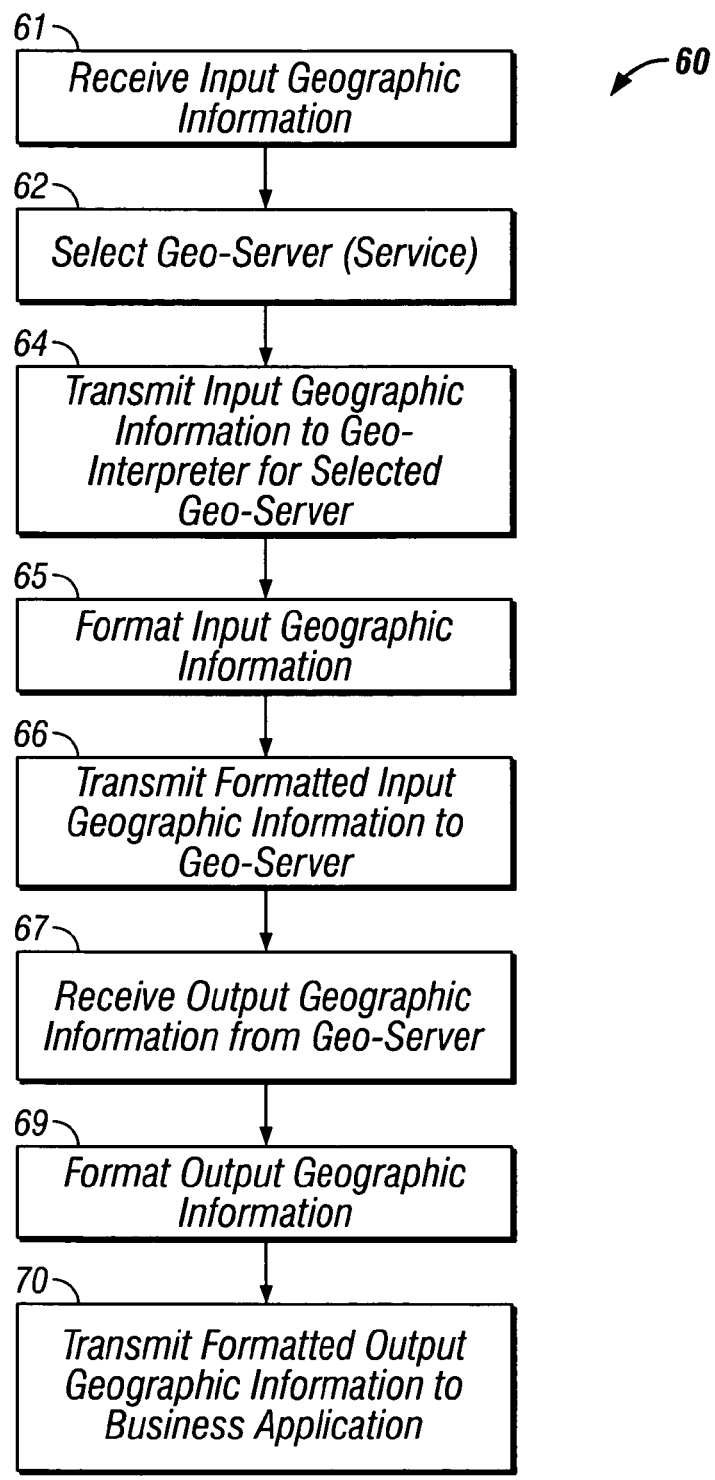
FIG. 4 is a flowchart showing a process performed by the Internet Graphics Server for providing a generic interface to plural geo-servers.

FIG. 4 shows a process 60, which is performed by software in IGS 14 for obtaining geographic information from one (or more) of geo-servers 15, 16, 17. Process 60 receives (61) input geographic information from business application 22. As noted above, the input geographic information is formatted as a table containing XML code.

Process 60 selects (62) a geo-server from which to obtain output geographic information that corresponds to the input geographic information. Process 60 may select the geo-server based on one or more factors. For example, the input geographic information may include an indication of which geo-server to select. A user on base computer system 12 may input the indication of which geo-server to select or IGS 14 or business application 22 may select a geo-server automatically based on the input geographic information (or some other criteria). Alternatively, multiplexer 36 (FIG. 2) may select the geo-server, e.g., to perform load balancing.

By way of example, one geo-server 15 may provide more accurate information for a particular country, such as Germany, than another geo-server 16. Accordingly, IGS 14 may contain a rule whereby each time a user indicates an address in Germany, IGS 14 automatically selects geo-server 15. The same process may be applied for other fields as well. For example, one geo-server may provide more accurate information for a particular continent (e.g., Europe), area of a city, country, area of a country, or for a particular mode of transportation. For example, one geo-server may provide more accurate information for roadways and another geo-server may provide more accurate information for railways.

In other instances, the desired geographic information may not be available from one geo-server, but may be available from another geo-server. If IGS 14 knows beforehand which geo-servers provide which information, IGS 14 can direct requests accordingly. If IGS 14 does not know the types of information available from the various geo-servers, IGS 14 can request the information from more than one geo-server. For example, IGS 14 can output a request to multiple geo-servers concurrently, or try each geo-server sequentially until IGS 14 obtains the requested information.

Process 60 transmits (64) the input geographic information to a geo-interpreter that corresponds to the selected geo-server. For example, if ESRI is selected as the geo-server, process 60 transmits the input geographic information to the geo-interpreter that is designed to work with ESRI. As noted above, this transmission may be performed via multiplexer 36 and a portwatcher.

The geo-interpreter receives the input geographic information and formats (65) the input geographic information (i.e., the generic XML-tabular format described above) so that it is compatible with the selected geo-server. That is, the geo-interpreter converts the data so that the format of the input geographic information is compatible with the data format of the selected geo-server. In the example described above, if the ESRI geo-interpreter is selected, the geo-interpreter converts the generic XML tabular data to the data format that is recognized by ESRI. The same process is true for geo-interpreters for other geographic services. Thus, IGS 14 provides a generic interface to multiple geo-servers.

Process 60 transmits (66) the reformatted input geographic information from the geo-interpreter to the selected geographic service, together with any instructions, such as the type of data requested from the geographic service. Transmission may be over a network, such as the Internet or the like. Since the data is in the format that is recognized by the geo-server, the geo-server can process the data and provide the requested output geographic information. For example, if the input geographic information is geographic coordinates, the output geographic information provided by the geo-server may be specific addresses that correspond to the input geographic coordinates.

The geo-server transmits its output (the output geographic information) back to IGS 14. The appropriate communication module, e.g., RFC listener module 34 or HTTP listener module 35, receives (67) the transmission and, via multiplexer 36 and a portwatcher, provides the output geographic information to the appropriate geo-interpreter. For example, if ESRI provides the output geographic information, the output geographic information is provided to the geo-interpreter (e.g., geo-interpreter 17) that is used to communicate with the ESRI server.

Geo-interpreter 17 formats (69) the output geographic information so that a format of the output geographic information is compatible with a device that provided the input geographic information. In this embodiment, the interpreter converts the geographic information received from the geo-server from the format that is recognizable by the geo-server to the XML-tabular format described above. Other conversions, however, may be performed.

Interpreter 17 transmits (70) the output geographic information in XML-tabular format back to base computer system 12. Transmission may be via a network, such as the Internet. Referring to FIG. 3, base computer system 12 receives (57) the output geographic information from interpreter 17, performs any necessary conversions on the output geographic information, and may store or display the results.

Different types of geocoding functions may be available through IGS 14 depending on the capabilities of the various geo-servers. These functions may be provided by sending the necessary instructions to a geo-server, obtaining the information from the geo-server, and sending that information back to the base computer system in the manner described above. In some cases, IGS 14 may perform some additional processing on data received from a geo-server before sending the data back to the base computer system.

The IGS "routing" function determines the route, distance and drive time between a start location and an end (target) location. IGS 14 provides the start and end locations (e.g., addresses, geographic coordinates, etc.) to a geo-server, which replies with the route, distance and drive time between the start and end locations. In addition, a user may define a sequence of stop-over locations (i.e., scheduled stops) that have to be passed on the way from the start location to the end location. The effects of these stop-over locations on the overall route, distance and drive time are taken into account by the geocoding service when determining the route, distance and drive time. The start and end locations may be defined in terms of their geographic coordinates, as described above.

The "average speed" function determines the expected average speed along a specified route. This information is provided by a geo-server once a route between two locations is specified, and can take into account the type of roadway along the route. For example, the average speed function may take into account whether a roadway is a highway, freeway, city road, etc. The geo-server uses the expected average speed, along with the route's distance, to determine the expected travel time along the route.

The "route determination" function is performed in IGS 14. The route determination function receives, from one or more geo-servers, several routes between a start location and an end location and selects one of the routes based on input criteria. For example, the criteria may be to select the shortest route or the quickest route. Other information, such as that described above with respect to the average speed function, may be used in making the selection. The information is then provided from IGS 14 to the business application, as noted above.

The "distance and duration matrix" function is performed by IGS 14. This function determines a matrix of distances and durations between various locations based on distances and durations obtained from one or more geo-servers.

The "map display" function generates a map for a given area defined by two geocoordinates. The two geocoordinates, which define opposite (diagonal) corners of the map, are provided to a geo-server. The geo-server replies with the requested map. The map can have different levels of detail. The level of detail depends on the geocoding service(s) used to obtain information for the map.

Building a Local Database

As noted herein, geo-servers can have a slow response time, which may be compounded by network delays. Accordingly, MDMR software 18 builds a local database 13, e.g., on base computer system 12. This local database 13 may then be used as a resource for obtaining geographic information. The local database provides more ready access to geographic information, resulting in faster system operation.

Figure 5:
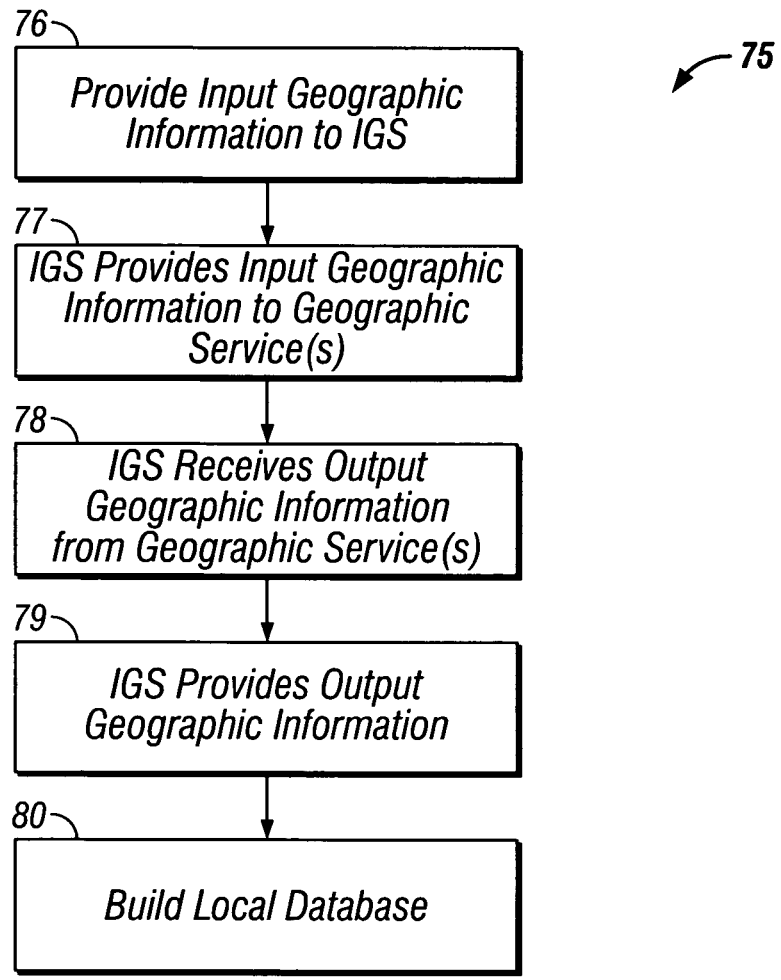
FIG. 5 is a flowchart showing a process for building a local database of geographic information.

FIG. 5 shows a process 75 that may be performed by MDMR software 18 to build local database 13. In the embodiment described below, process 75 uses IGS 14 to communicate with geo-servers 15, 16, 17, although use of IGS 14 is not required to perform process 75. Processes by which MDMR software 18 may communicate with IGS 14 are described above.

Referring to FIG. 5, MDMR software 18 provides geographic information to IGS 14 en masse, meaning that a relatively large amount of geographic information is provided (e.g., hundreds or even thousands of geographic coordinates). The geographic information may include sets of data, with each set of data comprising an instance of input geographic information that may include two or more geographic coordinates, addresses, or other location-defining indicia.

MDMR software 18 obtains the sets of data from a source. For example, the input geographic information may be read from a local or remote database (not shown) or may be input by a user via a GUI (not shown). In one embodiment, the database from which this initial geographic information is obtained is known as the "Location Master Data" database.

MDMR software 18 provides (76) the sets of data to IGS 14. Included within each set of data may be an indication of a geo-server to use for that set of data. For example, MDMR software 18 (or any other source) may request that a particular set of geographic coordinates be routed to a particular geo-server, such as geo-server 15. This may be done because MDMR software 18 "knows" that geo-server 15 provides more accurate information for the country in which the set of geographic coordinates is located.

Also included within each set of data may be indication(s) of type(s) of information to be obtained for that set of data. For example, MDMR software 18 may request, for a particular set of geographic coordinates, a route between the coordinates, a travel duration between the coordinates, a distance between the coordinates, addresses of the coordinates, and/or a map showing the coordinates. Other information may also be obtained, depending on the capabilities of the geo-servers.

IGS 14 receives the input geographic information from MDMR software 18 and provides (77) the input geographic information to a geo-server 15, 16, 17. That is, software in IGS 14 receives sets of data (i.e., instances of input geographic information) and determines the type of information to be obtained for that set and the geo-server to use. IGS 14 routes the input geographic information accordingly. Processes by which IGS 14 communicates with geo-servers 15, 16, 17 are described above.

IGS 14 receives (78), from one or more of geo-servers 15, 16, 17, output geographic information that corresponds to the input geographic information. For example, a geo-server 15, 16, 17 may provide one or more instances of output geographic information, such as routing and distance information between two or more locations, address information, travel time (duration) between two or more locations, and the like.

IGS 14 keeps track of the geographic server that provided the output geographic information. For example, IGS 14 may store, with each instance of received output geographic information, data identifying the geo-server that provided that instance of output geographic information. IGS 14 also keeps track of which input geographic information corresponds to which output geographic information. As above, IGS 14 may store, with each instance of output geographic information, data identifying the input geographic information that corresponds to the output geographic information.

IGS 14 provides (79), to MDMR software 18, the output geographic information, along with its "identifying data". In this context, "identifying data" is the data that identifies the geo-server that provided that instance of output geographic information and the data that identifies the input geographic information that corresponds to the output geographic information. Other data may also be included, depending on the circumstances.

IGS 14 may provide the foregoing information to MDMR software 22 immediately upon receipt from the geo-servers. Alternatively, IGS 14 may hold this information until IGS 14 obtains all the information, or some portion thereof, requested by MDMR software 18. In this case, the information may be provided en masse to MDMR software 18.

MDMR software 18 receives, from IGS 14, the output geographic information (e.g., en masse), along with the identifying data. MDMR software 18 builds (80) a local database 13 (e.g., on base computer 12 or accessible thereto) using the input geographic information, the output geographic information, and the identifying information The local database 13 indexes plural instances of output geographic information received from geo-servers 15, 16, 17 (via IGS 14) to plural instances of input geographic information originally provided by MDMR software 18 to IGS 14. MDMR software 18 uses the identifying data to index instances of input geographic information to instances of output geographic information.

The database may index instances of output geographic information based on which geographic server provided each of the instances of output geographic information. For example, the input geographic information may include two addresses in Germany and the output geographic information may include routes and distances between those two addresses. Different routes and distances may have been provided from different geo-servers 15, 16. Thus, the database may index the addresses to each of the routes and distances and to each geo-server that provided those routes and distances.

The database may index instances of output geographic information based on the geographic region (e.g., area of a country, a country, a continent) in which the input and/or output geographic information is located. In the example described above, the database may also include indices indicating that the addresses are located in Germany. The data may be indexed in page format or otherwise.

Other data may also be provided in the database, which may provide additional ways of accessing data stored therein.

MDMR software 18 also may update local database 13. In more detail, MDMR software 18 checks to determine if information defining a single transportation lane (e.g., a determined path between two locations) is in the local database. If the data is not found MDMR software 18 contacts IGS 14, which obtains the data in the manner described above. The obtained data is stored in the "Location Master Data" database and in local database 13. MDMR software 18 may also check to determine if information defining multiple transportation lanes is in the local database. If the data is not found, MDMR software 18 generates a batch-job that starts a preselection report to collect the data from a geo-server/geo-service via IGS 14. Once that data is received, the data is stored in the "Location Master Data" database and in local database 13.

Accessing the Local Database

One function of business application 22 is generating transportation lanes automatically if the transportation lanes do not already exist. To generate the transportation lanes, business application 22 uses distance and duration information between two locations. Business application 22 attempts to locate this information in local database 13. If business application 22 cannot locate this information in local database 22, business application 22 calculates a straight-line distance and duration between the geographic coordinates that are stored in the Location Master Data database, thereby generating the transportation lane.

Figure 6:
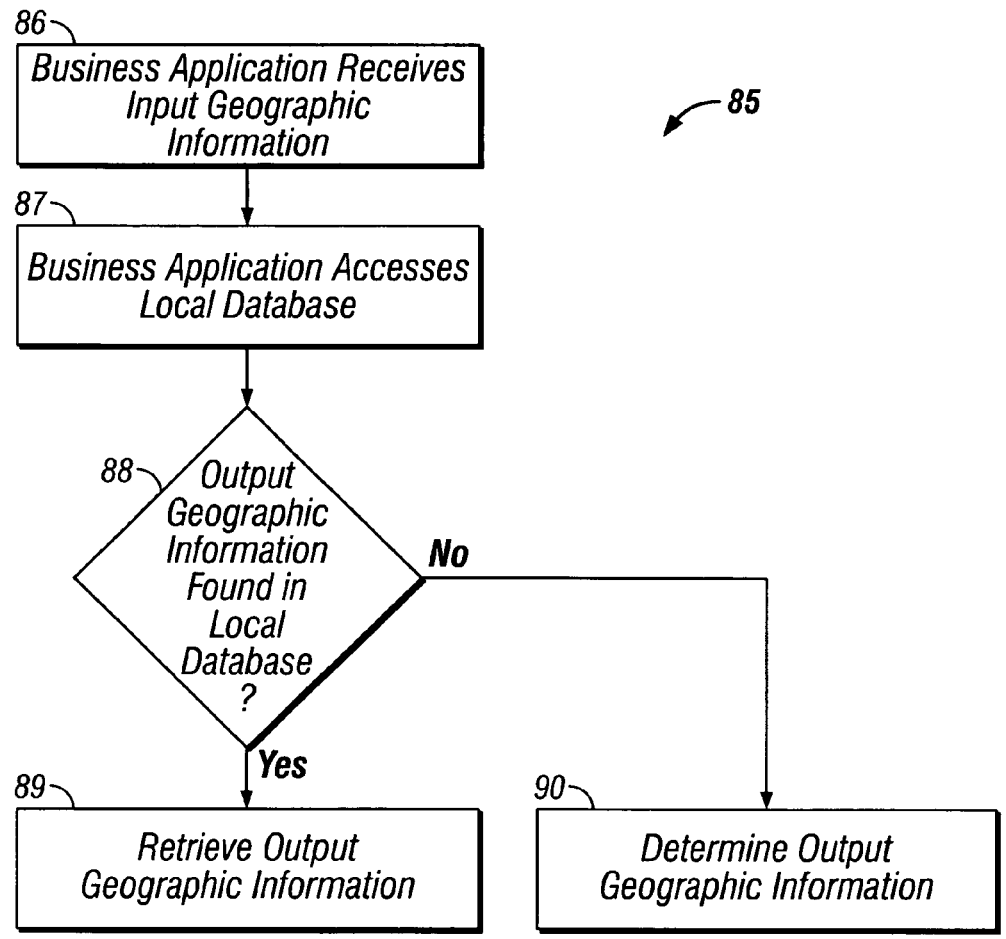
FIG. 6 is a flowchart showing a process by which a business application accesses the local database

Referring now to FIG. 6, a process 85 is shown by which business application 22 may obtain and process output geographic information from local database 13. In process 85, business application receives (86) input geographic information. The input geographic information may include a set of data, such as two addresses, two geographic coordinate, or the like, together with a request for information, such as a route and/or duration between the two addresses (for use in generating a transportation lane therebetween).

Business application 22 uses local database 13 as a resource for obtaining an output geographic information based on input geographic information, e.g., for obtaining routing and duration information (output geographic information, in this example) between two geographic coordinates (input geographic information, in this example).

In more detail, upon receiving the input geographic information, business application accesses (87) local database 13. Business application 22 determines (88) if local database 13 contains an instance of output geographic information that corresponds to the instance of input geographic information. If local database 13 contains output geographic information that corresponds to the input geographic information (88), business application 22 retrieves (89) the corresponding output geographic information from local database 13. This information is used to generate a transportation lane.

If local database 13 does not contain output geographic information that corresponds to the input geographic information (88), business application 22 obtains the original input geographic information (e.g., the geographic coordinates) from the "Location Master Data" database. Business application 22 determines (90) output geographic information using the original input geographic information. In this embodiment, business application 22 calculates the straight-line distance between the original geographic coordinates (the transportation lane) and the travel duration between those coordinates along the route at a designated speed. In this embodiment, business application does not reference IGS 14 directly.

Other Embodiments

Processes 75 and 85 can be implemented using hardware other than IGS 14 to act as an interface between business application 22 and geo-servers 15, 16, 17. Alternatively, MDMR software 18 may communicate directly with geo-servers 15, 16, 17, without going through a hardware (or software) interface, such as IGS 14. In such an embodiment, MDMR software 18 may perform the functions of IGS 14, e.g., communicating with the geo-servers and performing any necessary data conversions to effect such communications.

In the embodiment described above, MDMR software 18 generates local database 13 and stores local database 13 on base computer system 12. Local database 13 can be stored on the same machine as MDMR software 18, business application 22 and/or IGS 14, or local database 13 may be stored on a separate machine. In this regard, a single machine, or two or more machines, may implement the functionality of IGS 14 and/or execute MDMR software 18 and business application 22.

As described above, data is provided as input geographic information and output geographic information is provided for the data. In other embodiments, the input geographic information may not be broken into sets.

By way of example, one thousand geographic coordinates (referred to as #1 to #1000) may be provided en masse by MDMR software 18 to geo-servers 15, 16, 17 (e.g., via IGS 14). Geo-servers 15, 16, 17 may provide all available data between each geographic coordinate and every other geographic coordinate. For example, the geo-servers may provide all available information (e.g., routing, distance, etc.) between geographic coordinate #1 and geographic coordinates #2, #3, #4 . . . #1000, between geographic coordinate #2 and geographic coordinates #3, #4, #5 . . . #1000, between geographic coordinate #3 and geographic coordinates #4, #5, #6 . . . #1000, etc. In this embodiment, it may be possible to generate a more comprehensive database.

FIG. 1 shows computers on which processes 50, 60, 75 and 85 may be implemented. Although computers are shown in FIG. 1, processes 50, 60, 75 and 85 are not limited to use with the hardware and software of FIG. 1. These processes may find applicability in any computing or processing environment. Processes 50, 60, 75 and 85 may be implemented in hardware, software, or a combination of the two.

Processes 50, 60, 75 and 85 may be implemented in one or more computer programs executing on one or more programmable computers or other machines that each include a processor and a storage medium readable by the processor (including volatile and non-volatile memory and/or storage components).

Each such program may be implemented in a high-level procedural or object-oriented programming language to communicate with a computer system. However, the programs can be implemented in assembly or machine language. The language may be a compiled or an interpreted language.

Each computer program may be stored on a storage medium or other article of manufacture (e.g., CD-ROM, hard disk, or magnetic diskette) that is readable by a general or special purpose programmable computer for configuring and operating the computer when the storage medium or device is read by the computer to perform processes 50, 60, 75 and 85. Processes 50, 60, 75 and 85 may also be implemented as one or more machine-readable storage media, configured with one or more computer program(s), where, upon execution, instructions in the computer program(s) cause one or more machines to operate in accordance with processes 50, 60, 75 and 85.

The inventions described herein are not limited to the embodiments described above. For example, any number of geo-servers may be used, not just the three shown. Fewer than three may be used, e.g., one. Different types of geo-servers may also be used in addition to, or instead of, those noted herein. The processes described herein may be used outside the context of business application 22.

Other embodiments not described herein are also within the scope of the following claims.

What is claimed is:

1. A method for obtaining geographic information comprising:

receiving, on a base computer system, output geographic information en masse from one or more servers, the output geographic information comprising routes, travel durations and distances, the output geographic information corresponding to input geographic information provided by the base computer to the one or more servers en masse, the input geographic information comprising sets of locations, the sets of locations being defined in terms of geographic coordinates;

building, on the base computer system, a database that indexes at least some of the output geographic information to at least some of the input geographic information;

wherein building the database comprises indexing the output geographic information in the database based on which geographic server provided the output geographic information;

attempting to locate specific output geographic information in the database; wherein attempting comprises attempting to locate specific output geographic information that corresponds to specific input geographic information, and determining, by the base computer system, the specific output geographic information by calculation if the specific output geographic information cannot be located in the database, the calculated specific output geographic information being one of straight-line distance and duration.

2. A system comprising:
one or more servers; and
a computer system;
wherein the computer system comprises at least one memory that stores executable instructions and at least one processor that executes the instructions to:

receive output geographic information en masse from the one or more servers, the output geographic information comprising routes, travel durations and distances, the output geographic information corresponding to input geographic information provided to the one or more servers en masse, the input geographic information comprising sets of locations, the sets of locations being defined in terms of geographic coordinates;

build a database that indexes at least some of the output geographic information to at least some of the input geographic information;

wherein to build the database comprises indexing the output geographic information in the database based on which geographic server provided the output geographic information;

attempt to locate specific output geographic information in the database, wherein attempting comprises attempting to locate specific output geographic information that corresponds to specific input geographic information; and determine the specific output geographic information by calculation if the specific output geographic information cannot be located in the database, the calculated specific output geographic information being one of straight-line distance and duration.

3. The method of claim 1, wherein calculating comprises calculating the straight-line distance and duration using geographic coordinates as the specific input geographic information.

4. The method of claim 1, wherein receiving and building are performed by maintenance software and attempting and determining are performed by application software.

5. The method of claim 1, wherein building comprises indexing the output geographic information in the database by geographic region.

6. The system of claim 2, wherein calculating comprises calculating the straight-line distance and duration using geographic coordinates as the specific input geographic information.

7. The system of claim 2, wherein receiving and building are performed by maintenance software and attempting and determining are performed by application software.

8. The system of claim 2, wherein building comprises indexing the output geographic information in the database by geographic region.

9. The system of claim 8, wherein the geographic region comprises at least one of an area of a country, a country, and a continent.

10. The method of claim 5, wherein the geographic region comprises at least one of an area of a country, a country, and a continent.

* * * * *